(12) United States Patent
Usui (10) Patent No.: US 7,928,701 B2
(45) Date of Patent: *Apr. 19, 2011

(54) AC-DC CONVERTER

(75) Inventor: Hiroshi Usui, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 288 days.

This patent is subject to a terminal disclaimer.

(21) Appl. No.: 12/173,489

(22) Filed: Jul. 15, 2008

(65) Prior Publication Data

US 2009/0027931 A1  Jan. 29, 2009

(30) Foreign Application Priority Data

Jul. 23, 2007  (JP) .................................. 2007-191186

(51) Int. Cl.
*G05F 5/06* (2006.01)
*G05F 5/00* (2006.01)
(52) U.S. Cl. ....................................... 323/206; 323/208
(58) Field of Classification Search .......... 323/206–208, 323/266
See application file for complete search history.

(56) References Cited

U.S. PATENT DOCUMENTS

| 5,960,207 | A | 9/1999 | Brown | |
|---|---|---|---|---|
| 6,977,448 | B2 * | 12/2005 | Kanouda et al. | 307/66 |
| 7,092,266 | B2 * | 8/2006 | Frank | 363/65 |
| 7,372,239 | B2 * | 5/2008 | Kumagai et al. | 323/267 |
| 7,532,493 | B2 * | 5/2009 | Lou et al. | 363/65 |

OTHER PUBLICATIONS

U.S. Appl. No. 12/173,313, filed Jul. 15, 2008, Usui.

* cited by examiner

*Primary Examiner* — Adolf Berhane
*Assistant Examiner* — Emily Pham
(74) *Attorney, Agent, or Firm* — Oblon, Spivak, McClelland, Maier & Neustadt, L.L.P.

(57) ABSTRACT

An AC-DC converter includes a rectifier DB for rectifying an alternating current supplied from an alternating power source AC, a power factor controller 11a connected to an output side of the rectifier DB to improve a power factor and also output either a power or a current limited to a predetermined value, a DC-DC converter 12 that converts a voltage outputted from the power factor controller 11 to another voltage, a capacitor EDLC for storing an energy and a two-way converter 13 having one input/output terminals connected to the output side of the power factor controller 11a and the other input/output terminals connected to the capacitor to carry out a two-way power conversion.

5 Claims, 7 Drawing Sheets

AC-DC CONVERTER

BACKGROUND OF THE INVENTION

1. Field of the Invention

The present invention relates to an AC-DC (alternate current-direct current) converter for converting alternating current to direct current. More particularly, the invention relates to a technique of reducing an input current in outputting a peak voltage.

2. Description of the Related Art

Figure 1:
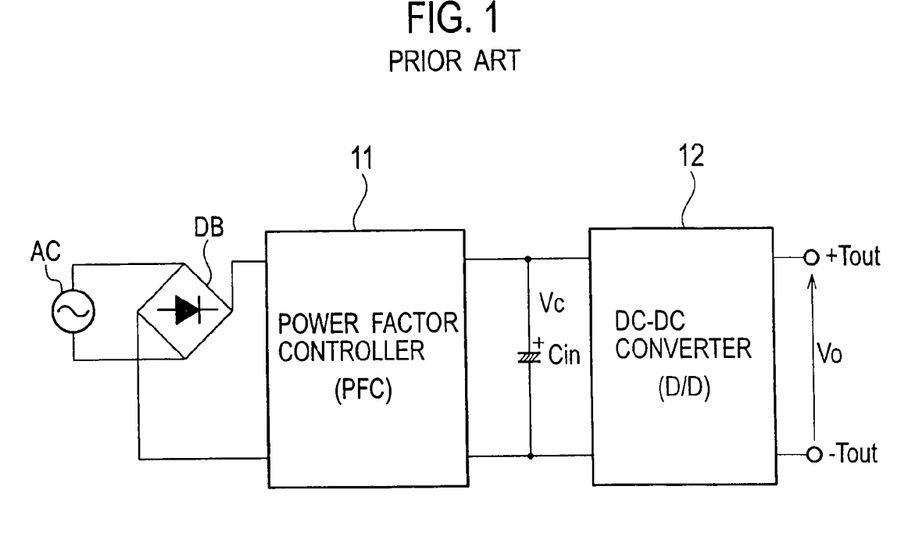
FIG. 1 is a view explaining a conventional AC-DC converter.

FIG. 1 shows a constitution of a conventional AC-DC converter disclosed in U.S. Pat. No. 5,960,207. The AC-DC converter includes a rectifier DB consisting of a diode bridge, an active power factor controller (PFC) 11, an input capacitor Cin and a DC-DC (direct current-direct current) converter (D/D) 12. The AC-DC converter operates as follows.

In operation, the rectifier DB rectifies AC power (85~265V) supplied from a commercial power source AC and outputs the full-wave rectified power to the power factor controller 11. If the power factor controller 11 is a type of global use, it boosts an output voltage of the rectifier DB to D.C. 380V. As a result, a voltage Vc on an input capacitor Cin of the DC-DC converter 12 connected to output terminals of the power factor controller 11 becomes D.C. 380V. Meanwhile, the power factor controller 11 allows the waveform of an input current to follow the waveform of an input voltage to improve a power factor of the AC-DC converter.

The DC-DC converter 12 inputs a D.C. voltage Vc supplied from the power factor controller 11 through the input capacitor Cin and further converts the voltage Vc to another D.C. voltage. The so-converted D.C. voltage (as an output voltage Vo) is supplied from output terminals +Tout, −Tout of the DC-DC converter 12 to a not-shown load.

SUMMARY OF THE INVENTION

Assuming that the power factor controller 11 of the above-mentioned conventional AC-DC converter has a conversion efficiency of 95%, while the DC-DC converter 12 has a conversion efficiency of 90, the whole conversion efficiency of the AC-DC converter becomes 85.5%. Here, it is noted that there is a limit in the current supplied through a normal plug outlet of the commercial power source AC, for example, 15 A at maximum in Japan. Therefore, in order to attain the input current from the commercial power source AC less than 15 A, a maximum output power under the regulated commercial power supply (e.g. A.C.100V in Japan) has to be established less than a predetermined value (e.g. 100V×15 A×85.5%=1282. 5 Wat.). In other words, it means that the conventional AC-DC converter cannot cope with an electrical equipment (load) consuming a power exceeding 1282. 5 W.

In the meantime, an electrical equipment of recent date, for example, as high-speed printer is constructed so as to consume a great power at printing. This electric power consumption in the high-speed printer is apt to get larger as the printing speed is increased. As for a power unit for such a high-speed printer, there is an attempt to improve the conversion efficiency of the power unit, for the purpose of supplying the printer with a great power as possible, in view of its printing at a higher speed.

However, it should be noted that there is a limit in the improvement of conversion efficiency of the power unit and therefore, the attempt of increasing a power to be picked up is saturated recently. For speeding up of the printer in spite of the above situation, there would be required an exclusive commercial plug outlet or an installation for picking up a power through biserial commercial power lines, causing an increasing of troublesome tasks and the AC-DC converter to be expensive.

Under the above-mentioned situation, an object of the present invention is to provide an inexpensive AC-DC converter capable of acquiring an electrical power through a normal plug outlet of the commercial power source and also coping with a higher peak power on the side of an electrical load.

In order to solve the above-mentioned problem, according to a first aspect of the present invention, there is provided an AC-DC converter comprising: a rectifier for rectifying an alternating current supplied from an AC power source; a power factor controller connected to an output side of the rectifier to improve a power factor and also output either a power or a current limited to a predetermined value; a DC-DC converter that converts a voltage outputted from the power factor controller to another voltage; a capacitor for storing an energy; and a two-way converter having one input/output terminals connected to input terminals of the DC-DC converter and the other input/output terminals connected to the capacitor to carry out a two-way power conversion.

DETAILED DESCRIPTION OF THE PREFERRED EMBODIMENTS

Referring to drawings, various embodiments of the present invention will be described below, in detail.

$1^{st}$. Embodiment

Figure 2:
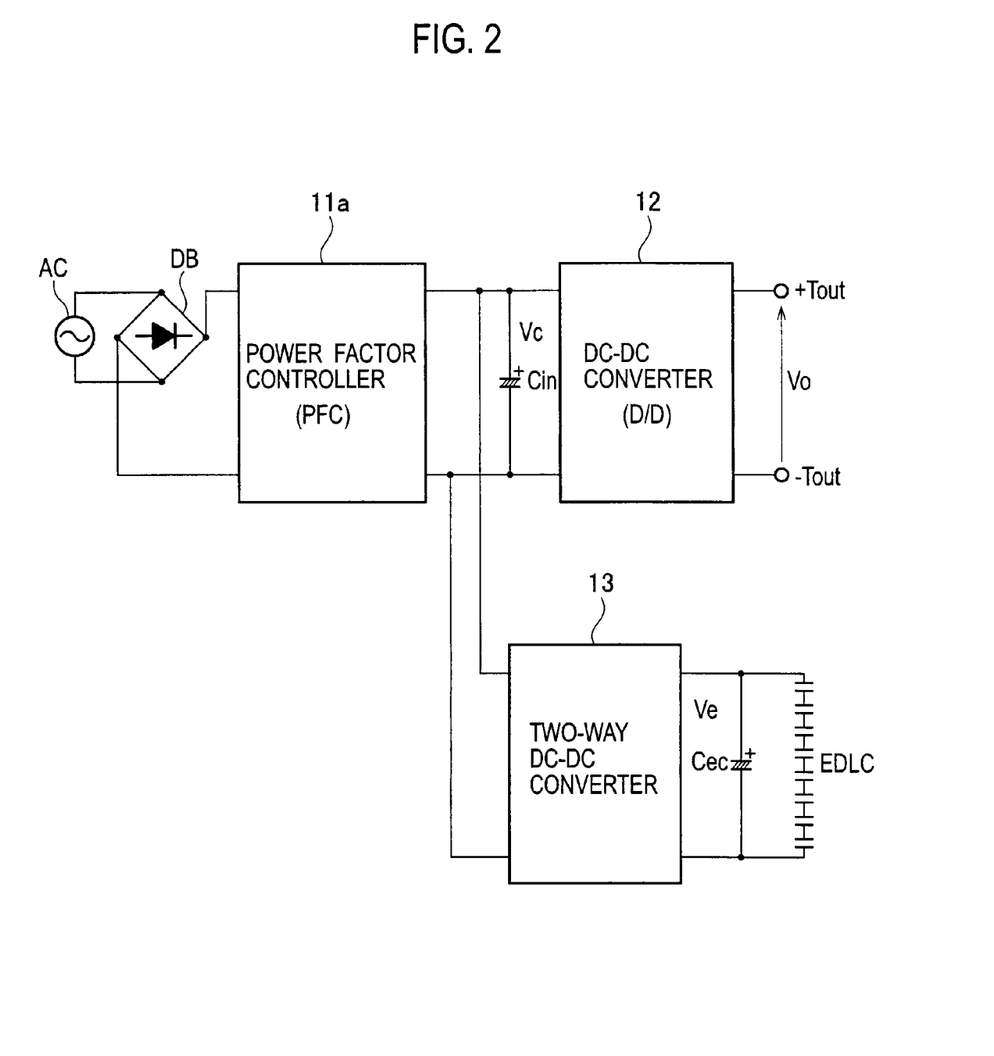
FIG. 2 is a view showing the constitution of an AC-DC converter in accordance with a first embodiment of the present invention.

FIG. 2 is a view showing the constitution of an AC-DC converter in accordance with the first embodiment of the present invention. Note, elements identical to constituents of the conventional AC-DC converter of FIG. 1 are indicated with the same reference numerals respectively and further, their overlapping descriptions are eliminated.

Besides the constituents of the conventional AC-DC converter of FIG. 1, the AC-DC converter of the first embodiment further includes a two-way DC-DC converter 13, a smoothing capacitor Cec and an electric double layer capacitor EDLC. Again, the AC-DC converter includes a power factor controller 11a in place of the power factor controller 11 of the conventional AC-DC converter.

In the two-way converter 13, its input/output terminals (first input/output terminals) on one side are connected between both ends of an input capacitor Cin (i.e. between output terminals of the power factor controller 11a and input terminals of the DC-DC converter 12). Input/output terminals (second input/output terminals) of the two-way DC-DC converter 13 on the other side are connected in parallel with the smoothing capacitor Cec and the electric double layer capacitor EDLC. The electric double layer capacitor EDLC is formed by a plurality of cells (e.g. eight cells) connected in series, corresponding to a desired withstand voltage.

The two-way DC-DC converter 13 has a two-way power converting function corresponding to a predetermined power conversion ratio. In detail, when a voltage at the first input/output terminals is higher than a voltage at the second input/output terminals adding a tinge of the predetermined power conversion ratio, the two-way DC-DC converter 13 converts the output voltage Vc supplied to the first input/output terminals to a voltage Ve and further outputs it from the second input/output terminals. Consequently, the smoothing condenser Cec and the electric double layer capacitor EDLC are recharged with electricity.

On the other hand, when the voltage at the first input/output terminals is lower than the voltage at the second input/output terminals adding a tinge of the predetermined power conversion ratio, the two-way DC-DC converter 13 converts the voltage Ve supplied from the electric double layer capacitor EDLC connected to the second input/output terminals and outputs the so-converted voltage through the first input/output terminals. Consequently, the above voltage outputted from the first input/output terminals of the two-way DC-DC converter 13 is added to the output voltage of the power factor controller 11a, so that the DC-DC converter 12 is supplied with the voltage Vc.

Figure 3:
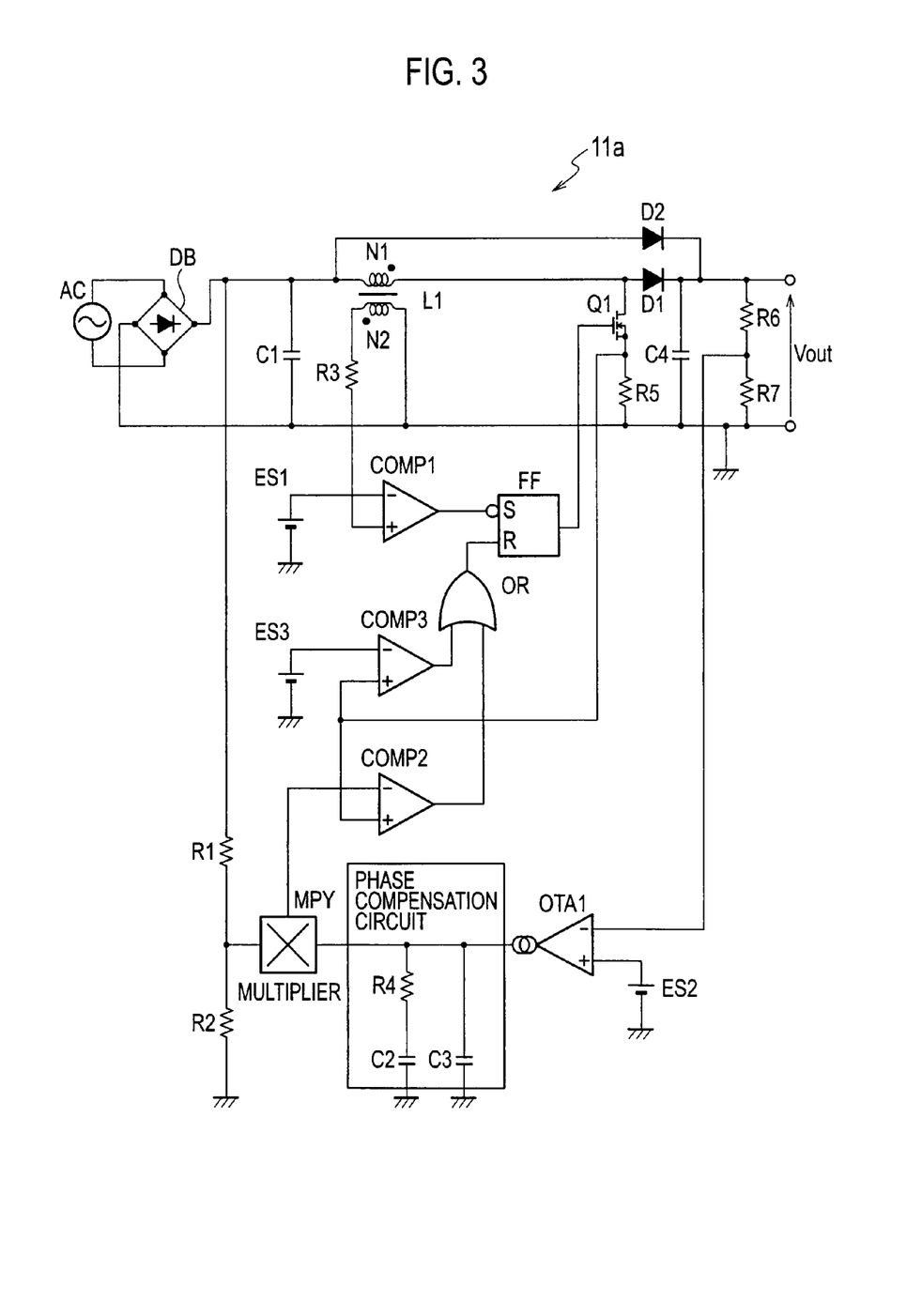
FIG. 3 is a circuitry diagram showing the detailed constitution of a power factor controller used in the AC-DC converter of the first embodiment of the present invention.

The power factor controller 11a outputs a current limited to a predetermined value (limited current Is). FIG. 3 is a circuitry diagram showing the detailed constitution of the power factor controller 11a. The power factor controller 11a is one operating in the critical mode. In a voltage obtained as a result of being full-wave rectified by the rectifier DB, its sinusoidal component is detected due to resistances R1, R2 and further inputted into one input terminal of a multiplier MPY. A capacitor C1 operates as a noise filter, while a diode D2 is a by-pass diode.

In the initial state, a flip flop FF is set up and a switching element Q1 is turned ON. Consequently, a current from the rectifier DB flows through a primary winding N1 of a reactor L1, the switching element Q1 and a resistance R5. Then, the reactor L1 is charged with energy. An output voltage Vout is divided by resistances R6, R7 and further compared with a reference voltage ES2 at an operational amplifier OTA1 composed of a constant-current type conductive amplifier. An output from the operational amplifier OTA1 is inputted into the other input terminal of the multiplier MPY through a phase compensating circuit comprising a capacitor C3, a resistance R4 and a capacitor C2.

The multiplier MPY multiplies a voltage at the connection point between the resistance R1 and the resistance R2 by a voltage inputted from the operational amplifier OTA1 through the phase compensating circuit and further outputs a multiplication result as a target for a switching current to a comparator COMP2.

The switching current flowing through the switching element Q1 is detected as a voltage on both ends of the resistance R5 and compared with the target for the switching current by the comparator COMP2. When the switching current reaches the target, the flip flop FF is reset by a signal transmitted from a comparator COMP2 through an OR (logical add) circuit OR, so that the switching circuit Q1 is turned OFF.

If the switching circuit Q1 is turned OFF, then the energy stored in the reactor L1 is superimposed on the input voltage and generated to an outside through a rectifying diode D1 and an output capacitor C4. Then, when the discharging of energy from the reactor L1 is completed, a voltage in a winding N2 of the reactor L1 is reversed. This reversal of voltage is detected since the comparator COMP1 compares the voltage with a reference voltage ES1. Consequently, the flip flop FF is set up again, so that the switching element Q1 is turned ON. By repeating the above-mentioned operation, the improvement in power factor can be accomplished.

The power factor controller 11a has a function of limiting an output current. As mentioned above, the switching current flowing in the switching element Q1 is detected as the voltage on both ends of the resistance R5 and further compared with a reference voltage ES3 by a comparator COMP3. If the voltage on both ends of the resistance R5 equivalent to the switching current gets larger than the reference voltage ES3, then the flip flop FF is reset by the signal transmitted from the comparator COMP3 through the OR circuit OR, so that the switching element Q1 is turned OFF. Thus, a peak value of the switching current is limited to the reference voltage ES3. Namely, the current generated from the power factor controller 11a is limited to an output limiting current $I_S$.

According to the power factor controller 11a constructed above, if the load gets increased, then the output current from the power factor controller 11a is suppressed to cause a limit on the input current from the commercial power source AC. Assume, for instance, the power factor controller 11a has a conversion efficiency of 95%. Then, in order to prevent an input current from exceeding 15A under the input of AC 100V, the output limiting current Is from the power factor controller 11a is set to 3.75 A (=AC 100V×15 A×95%÷380 V). With this establishment of the output limiting current $I_S$, it is possible to limit the input current to 15 A irrespective of loads.

Meanwhile, it is noted that high-speed printer consumes a fifth part of a peak power on the average although it consumes a great power during printing. Thus, on condition that a load such as the high-speed printer is connected to the AC-DC converter, a current would reach the above output limiting current $I_S$ only in the printing operation. Once the current reaches the output limiting current $I_S$, the power factor controller 11a is controlled so as to output a reduced voltage.

In the situation, there arises an energy supply from the electric double layer capacitor EDLC connected to the second input/output terminals of the two-way DC-DC converter 13, so that a power is outputted from the first input/output terminals of the converter 13. In this way, the DC-DC converter 12 can be supplied with the power corresponding to both capabilities of the two-way DC-DC converter 13 and the electric double layer capacitor EDLC.

Thus, even if a power exceeding 15 A in terms of the input current from the commercial power AC is to be consumed by the load, the peak power could be supplemented by the electric double layer capacitor EDLC while maintaining the input current from the commercial power AC less than 15 A. Note, the charging against the electric double layer capacitor EDLC is carried out during the period where the high-speed printer is not printing.

As mentioned above, according to the AC-DC converter of the first embodiment, it is possible to supply the high-speed printer with a greater peak power while restraining the input current from the commercial power AC less than 15 A. Therefore, there is no need of providing an exclusive commercial plug outlet or an installation for picking up power from the two-line commercial power line, dissolving problems of troublesome task and a high-priced AC-DC converter.

2nd. Embodiment

Figure 4:
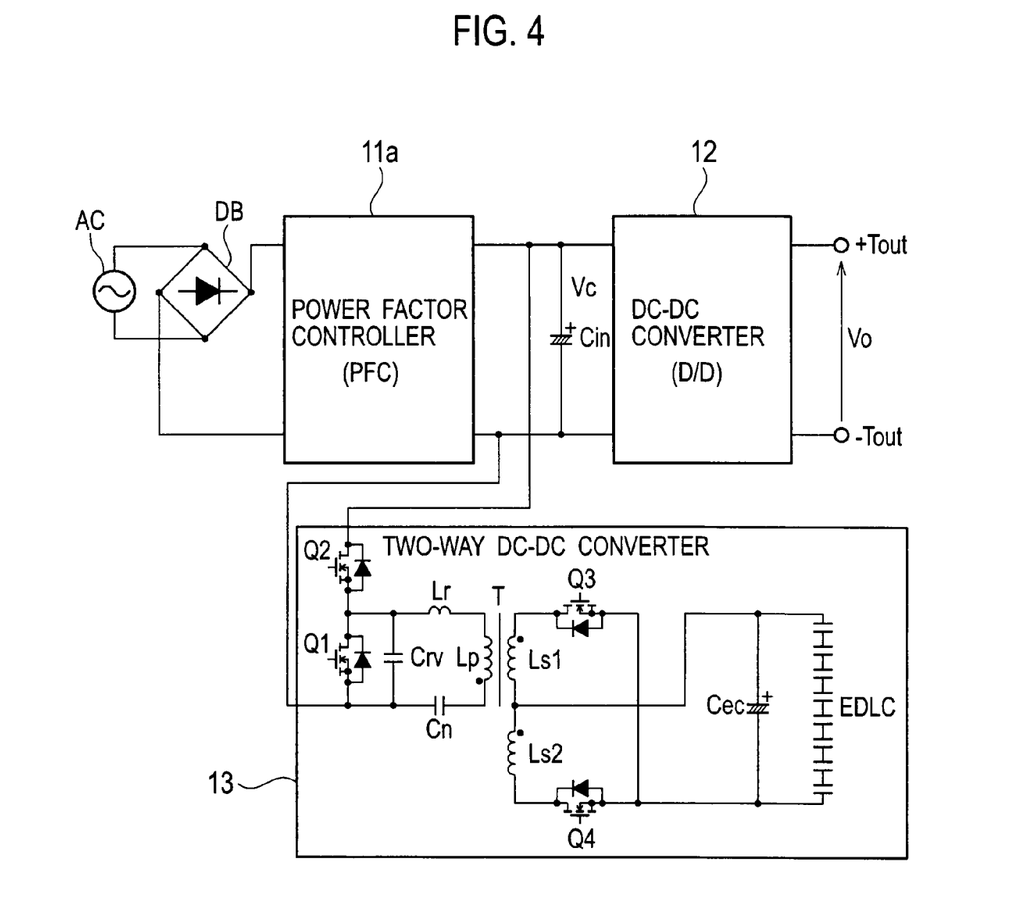
FIG. 4 is a view showing the constitution of an AC-DC converter in accordance with a second embodiment of the present invention.

According to the second embodiment of the present invention, the two-way DC-DC converter 13 of the first embodiment shown in FIG. 2 is embodied. FIG. 4 is a block diagram showing the constitution of the AC-DC converter of the second embodiment. Note, constituents identical to those of the AC-DC converter of the first embodiment are indicated with the same reference numerals and their descriptions are eliminated. We now explain differences from the first embodiment, that is, only the constitution of the two-way DC-DC converter 13.

In the two-way DC-DC converter 13, its primary side comprises a half bridge current resonant circuit having a switching element Q1 and a switching element Q2, while the secondary side comprises a synchronous rectification type both-wave rectifier circuit having a switching element Q3 and a switching element Q4. In the two-way DC-DC converter 13, the switching elements Q1, Q4 are operated simultaneously with each other, while the switching elements Q2, Q3 are also operated simultaneously with each other. In this way, these switching elements are controlled so as to turn ON/OFF with respective dead times alternately.

On the primary side of a transformer T, there are the first switching element Q1 and the second switching element Q2 which are connected in series between the first input/output terminals and on which a voltage (output voltage Vc) on both ends of the output capacitor Cin is applied, a voltage pseudo-resonance capacitor Crv connected in parallel with the first switching element Q1 and a series resonance circuit connected with both ends of the voltage pseudo-resonance capacitor Crv. In the series resonance circuit, a primary winding Lp of the transformer T, a resonance reactor Lr and a current resonance capacitor Cri are connected in series. Note, the resonance reactor Lr may be provided by a leakage inductance of the transformer T.

On the secondary side of the transformer T, there are a first secondary winding Ls1 and a second secondary winding Ls2 both of which are wound so as to generate a voltage having a reversed phase against the voltage of the primary winding Lp of the transformer T. A connection point between the first secondary winding Ls1 and the second secondary winding Ls2 forms one of the second input/output terminals, while a signal line extending from the first secondary winding Ls1 via the switching element Q3 is connected to a signal line extending from the second secondary winding Ls2 via the switching element Q4 to form the other of the second input/output terminals. Respective ON/OFF states in the first to the fourth switching elements Q1 to Q4 are controlled by a not-shown controller.

In the so-constructed two-way DC-DC converter 13, a LC resonant current flows through the series resonance circuit on the primary side of the transformer T. Further, an exciting current of the transformer T is superimposed on the LC resonant current. In each of the switching elements Q1 to Q4, a current flows in one half-cycle of the LC resonance frequency. Accordingly, the current during the switch ON substantially reaches zero but the exciting current only. The exciting energy by the exciting current is stored in the transformer T and produces a voltage pseudo-resonance after each of the switching elements is turned OFF, providing a voltage pseudo-resonance waveform due to an inductance of the transformer T and the voltage pseudo-resonance capacitor Crv. Each switching element has an on-time at a constant frequency where a dead time of the voltage pseudo-resonance period is added to one half cycle of the LC resonance frequency.

As mentioned above, according to the second embodiment of the present invention, the AC-DC converter can accomplish a high conversion efficiency with the realization of zero-current switching and zero-voltage switching.

3rd. Embodiment

According to the third embodiment of the present invention, the two-way DC-DC converter 13 of the first embodiment shown in FIG. 2 is embodied by a different circuit from that of the second embodiment.

Figure 5:
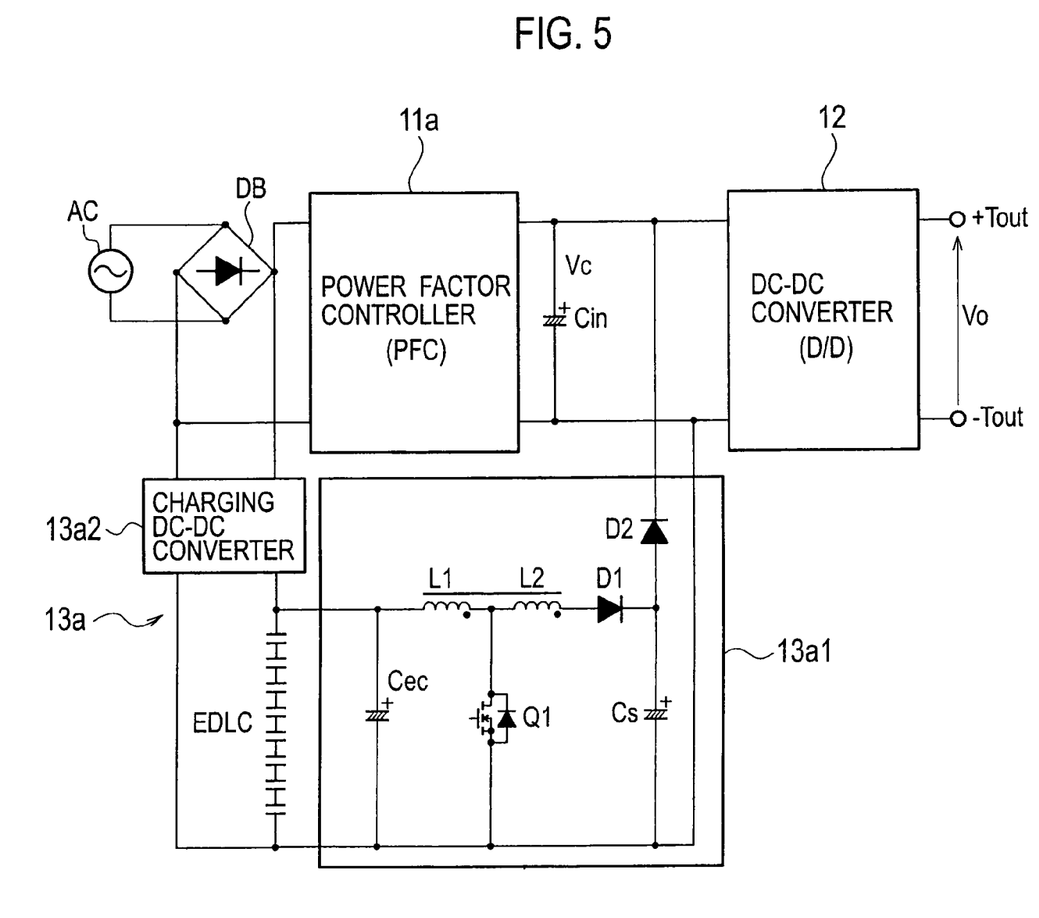
FIG. 5 is a view showing the constitution of an AC-DC converter in accordance with a third embodiment of the present invention.

FIG. 5 is a block diagram showing the constitution of the AC-DC converter of the fourth embodiment. Note, constituents identical to those of the AC-DC converter of the first embodiment are indicated with the same reference numerals and their descriptions are eliminated. We now explain only a two-way DC-DC converter 13a which is different from that of the first embodiment. The two-way DC-DC converter 13a comprises a boost type DC-DC converter 13a1 composed of one-way boost type chopper circuit and a charging DC-DC converter 13a2.

In the shown embodiment, the charging DC-DC converter 13a2 has input terminals connected to the output terminals of the rectifier DB. However, the input terminals of the charging DC-DC converter 13b2 may be connected to the output terminals of the power factor controller 11a.

The boost type DC-DC converter 13a1 comprises reactors L1, L2 in the form of a transformer, a switching element Q1, a rectifying diode D1, an output capacitor Cs and an anti-backflow diode D2. The reason of employing the reactors L1, L2 in the form of a transformer is that the two-way DC-DC converter 13a is required to have a relatively-high boost ratio as the voltage of the electric double layer capacitor EDLC is generally low. Thus, the reactor L2 may be eliminated depending on the application.

The diode D2 prevents a backflow of current and maintains the voltage of the output capacitor Cs in order to prevent a standstill of the boost type DC-DC converter 13a1 under unloaded condition. The reason of maintaining the boost type DC-DC converter 13a1 in operation is that if it is suspended, it would take a long time to begin the operation of the converter 13a1. Therefore, if voltage of the output capacitor Co becomes lower than the voltage of the output capacitor Cs, then current automatically flows out through the diode D2 to supply the load with energy.

The charging DC-DC converter 13a2 is controlled so as to charge the electric double layer capacitor EDLC during the period where the boost type DC-DC converter 13a1 is not feeding a peak power to the load.

As mentioned above, the similar effect to that of the AC-DC converter of the first embodiment can be realized in this embodiment.

In common with the first to the third embodiments, the AC-DC converter is constructed so as to limit the output current of the power factor controller 11a to a predetermined value (i.e. the output limiting current). In the modification, the AC-DC converter may be constructed so as to limit the output power in place of the output current.

4th. Embodiment

Figure 6:
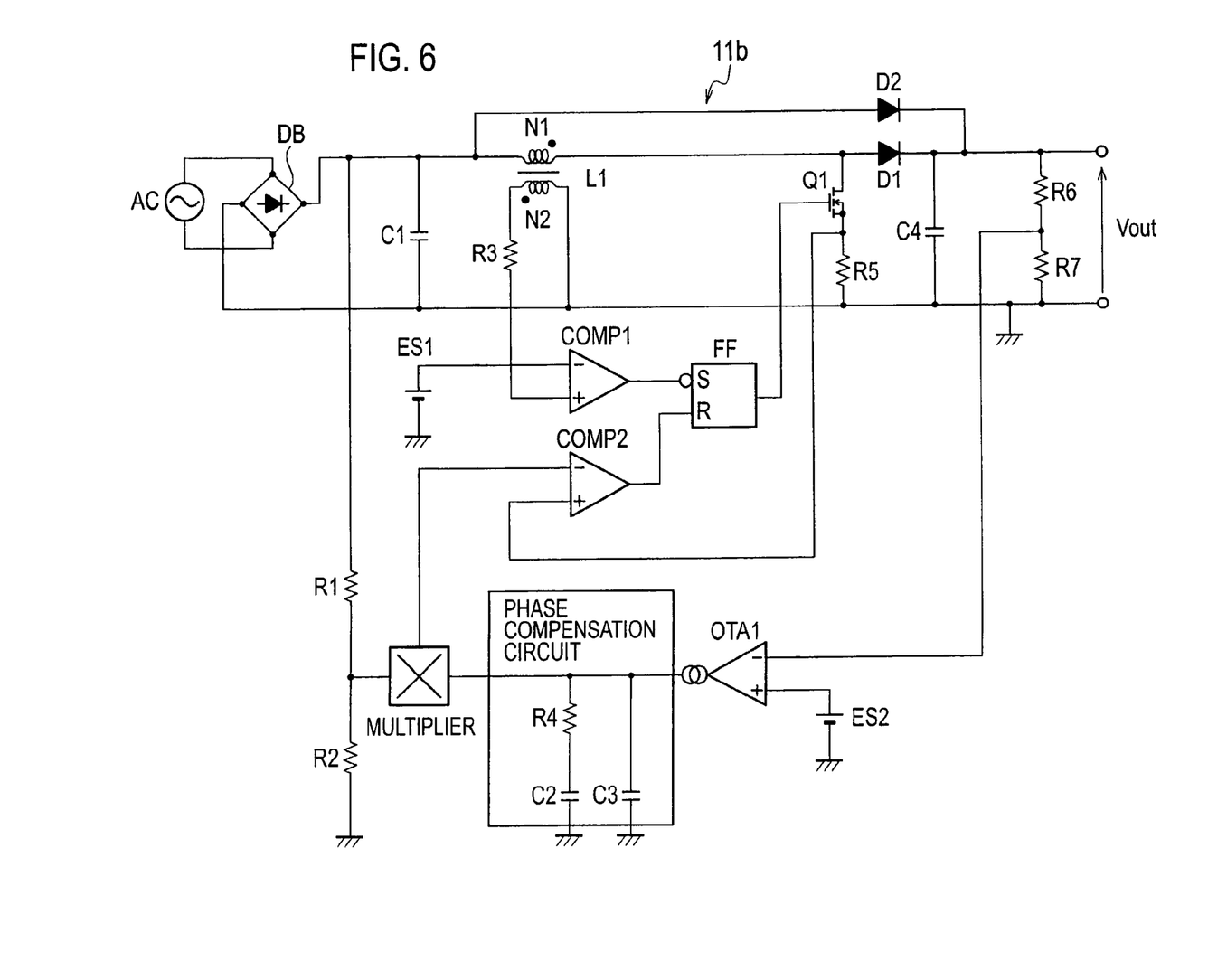
FIG. 6 is a circuitry diagram showing the detailed constitution of a power factor controller used in an AC-DC converter of a fourth embodiment of the present invention.

According to the fourth embodiment of the present invention, the AC-DC converter includes a power factor controller 11*b* to control its output voltage. In detail, the power factor controller 11*b* is adapted so as to apply a feedback control on an output voltage detected by the output voltage detecting circuit, with a delay of a predetermined time since an occurrence of a peak load. We now describe only the power factor controller 11*b*.

FIG. 6 is a circuitry diagram showing the constitution of the power factor controller 11*b* used in the AC-DC converter of the fourth embodiment. The power factor controller 11*b* of the sixth embodiment can be obtained by eliminating the comparator COMP3, the source of the reference voltage ES3 and the OR circuit OR from the power factor controller 11*a* of the first embodiment (FIG. 3). That is, the power factor controller 11*b* is constructed so that the output of the comparator COMP2 is inputted to a reset terminal R of the flip flop FF directly. The output voltage detecting circuit is formed by the resistances R6, R7 and the operational amplifier OTA1.

As for the above-constructed power factor controller 11*b*, we now explain an operation of applying the feedback control on the detection result of the output voltage detecting circuit back, with a delay of a predetermined time since a leak load has occurred.

A constant-current type conductive amplifier is adopted as the operational amplifier OTA1 in the output voltage detecting circuit (in view of serving both as CV and OV). Of course, the operational amplifier OTA1 may be formed by a normal operational amplifier. In the conductive amplifier, its gain is generally determined by an internal circuit constant. Thus, only a phase response is determined by the resistance R4, the capacitor C2 and the capacitor C3 all constituting an external phase compensating circuit.

Thus, the response time can be determined by an outflow current of the operational amplifier OTA1 and a damping time constant of the CR circuit forming the phase compensating circuit. Accordingly, it is carried out to determine a damping time constant of the circuit composed of the resistance R4 and the capacitors C2 and C3 in order that the output of the operational amplifier OTA1 is delayed behind the peak load by a predetermined time. Consequently, even if the power consumption of the electrical load reaches a peak, the power factor controller 11*b* would not respond such a situation immediately, so that the output voltage is lowered. In this state, energy is supplied from the electric double layer capacitor EDLC to the DC-DC converter 12 through the two-way DC-DC converter 13. As a result, the load is supplied with a power for supporting the peak load from the DC-DC converter 12.

As mentioned above, according to the AC-DC converter of the fourth embodiment, it is possible to form the power factor controller 11*b* by small converters incompatible for the leak load.

5$^{th}$. Embodiment

Figure 7:
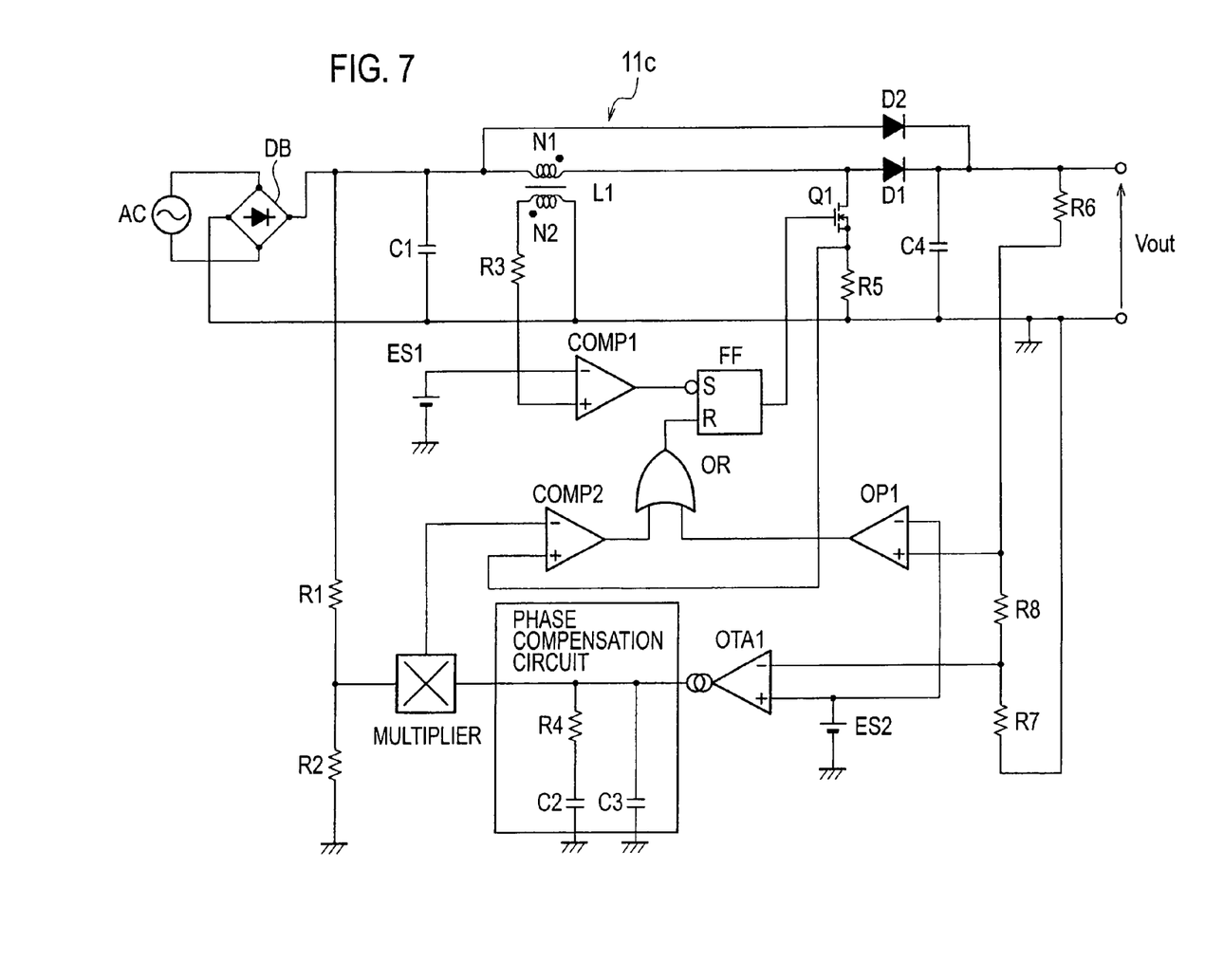
FIG. 7 is a circuitry diagram showing the detailed constitution of a power factor controller used in an AC-DC converter of a fifth embodiment of the present invention.

According to the fifth embodiment of the present invention, the AC-DC converter includes a power factor controller 11*c*, as shown in FIG. 7. We now describe only the power factor controller 11*c*.

The power factor controller 11*c* can be obtained by adding a resistance R8 in between the resistance R6 and the resistance R7 in the output voltage detecting circuit of the power factor controller 11*b* of the fourth embodiment and further adding an operational amplifier OP1 and an OR circuit OR. Both of the operational amplifier OP1 and the OR circuit OR correspond to the high-speed responsive output voltage detecting circuit of the present invention.

In the output voltage detecting circuit, a connection point between the resistance R8 and the resistance R7 is connected to an inverting input terminal (−) of the operational amplifier OTA1. In the high-speed responsive output voltage detecting circuit, a noninverting input terminal (+) of the operational amplifier OP1 is connected to a connection point between the resistance R8 and the resistance R6, while an inverting input terminal (−) of the operational amplifier OP1 is supplied with a reference voltage ES2. The output of the operational amplifier OP1 is fed to the OR circuit OR. Additionally, an output of the comparator COMP2 is also fed to the OR circuit OR. The output of the OR circuit OR is supplied to a reset terminal of the flip flop FF.

In the above-constructed AC-DC converter of the fifth embodiment, owing to the interposition of the resistance R8 between the resistances R6 and R7, it is carried out for the operational amplifier OP1 to detect a voltage somewhat larger (larger by only a predetermined value) than the output voltage detected by the output voltage detecting circuit (the operational amplifier OTA1) and continuously reset the flip flop FF. As there is no phase compensating circuit on the output's side of the operational amplifier OP1, the AC-DC converter is capable of responding variations of electrical load at a high speed.

As mentioned above, according to the AC-DC converter of the fifth embodiment, with an addition of the high-speed responsive output voltage detecting circuit in spite of the presence of such a dull output voltage detecting circuit, it is possible to prevent an output voltage from being overshot due to a sudden change of the electrical load.

Finally, it will be understood by those skilled in the art that the foregoing descriptions are nothing but eight embodiments of the disclosed AC-DC converter and therefore, various changes and modifications may be made within the contents of the present invention.

This application is based upon the Japanese Patent Application No. 2007-191186, filed on Jul. 23, 2007, the entire content of which is incorporated by reference herein.

What is claimed is:
1. An AC-DC converter comprising:
a rectifier for rectifying an alternating current supplied from an AC power source;
a power factor controller connected to an output side of the rectifier to improve a power factor and also output either a power or a current limited to a predetermined value;
a DC-DC converter that converts a voltage outputted from the power factor controller to another voltage;
a two-way converter that carries out a two-way power conversion, the two-way converter being provided with first input/output terminals and second input/out terminals, the first input/out terminals connected to input terminals of the DC-DC converter; and
a first capacitor for storing energy, the first capacitor being connected to the second input/output terminals of the two-way converter.
2. The AC-DC converter of claim 1, wherein
the power factor controller includes an output voltage detecting circuit that detects an output voltage and applies a feedback control on the output voltage with a delay of a predetermined time since a peak load to thereby control the output voltage.
3. The AC-DC converter of claim 2, wherein
the power factor controller includes a high-speed responsive output voltage detecting circuit that detects a voltage higher than the output voltage detected by the output voltage detecting circuit by a predetermined value and carries out a feedback control based on the voltage as a detection result to thereby control the output voltage.

4. The AC-DC converter of claim 3, wherein
the voltage detected by the output voltage detecting circuit has a lowest value,
the feedback control is applied on the voltage having the lowest value with the delay of the predetermined time since the peak load,
the voltage detected by the high-speed responsive output voltage detecting circuit has a value higher than the voltage detected by the output voltage detecting circuit, and
the feedback control is applied on the voltage detected by the high-speed responsive output voltage detecting circuit, in advance of the delay of the output voltage detecting circuit.

5. The AC-DC converter of claim 1, further comprising a second capacitor interposed between the power factor controller and the DC-DC converter.

* * * * *